United States Patent
Jain

(10) Patent No.: US 9,600,624 B2
(45) Date of Patent: Mar. 21, 2017

(54) SYSTEM AND METHOD FOR SIMULATING AERODYNAMICS OVER AN AIRCRAFT FOR A DEFLECTED POSITION OF A MOVABLE AIRCRAFT CONTROL SURFACE USING A STRUCTURED CHIMERA MESH

(71) Applicant: AIRBUS ENGINEERING CENTRE INDIA, Bangalore (IN)

(72) Inventor: Tarun Jain, Bangalore (IN)

(73) Assignee: AIRBUS GROUP INDIA PRIVATE LIMITED, Bangalore, Karnataka (IN)

( * ) Notice: Subject to any disclaimer, the term of this patent is extended or adjusted under 35 U.S.C. 154(b) by 664 days.

(21) Appl. No.: 13/684,175

(22) Filed: Nov. 22, 2012

(65) Prior Publication Data
US 2013/0144582 A1 Jun. 6, 2013

(30) Foreign Application Priority Data
Dec. 2, 2011 (IN) .......................... 4191/CHE/2011

(51) Int. Cl.
*G06F 17/50* (2006.01)
*B64C 5/10* (2006.01)
(Continued)

(52) U.S. Cl.
CPC ............ *G06F 17/5095* (2013.01); *B64C 5/10* (2013.01); *G06F 17/5018* (2013.01);
(Continued)

(58) Field of Classification Search
None
See application file for complete search history.

(56) References Cited

U.S. PATENT DOCUMENTS 7,617,083 B2 11/2009 Bennis et al.
2010/0280802 A1* 11/2010 Calmels ........................... 703/2

OTHER PUBLICATIONS

F. Blanc, et al., "Numerical Methods for Control Surfaces Aerodynamics With Flexibility Effects," On the Web at http://www.cerfacs.fr/~cfdbib/repository/TR_CFD_09_54.pdf, shown by Wayback Web Archive to have been published before Dec. 18, 2010, 15 pages.*

(Continued)

*Primary Examiner* — Aniss Chad
*Assistant Examiner* — David M Rogers
(74) *Attorney, Agent, or Firm* — Prakash Nama; Global IP Services, PLLC

(57) ABSTRACT

A system and method for simulating aerodynamics over an aircraft for a deflected position of a movable aircraft control surface using a structured chimera mesh are disclosed. In one embodiment, a mesh assembly of the aircraft is created by overlapping a background mesh and a structured chimera mesh for the deflected position of the movable aircraft control surface. Further, mesh cell sizes within overlapping boundaries of the background mesh and the structured chimera mesh are analyzed. Furthermore, the structured chimera mesh is regenerated based on the analysis. In addition, the mesh assembly of the aircraft is reformed based on the regenerated structured chimera mesh. Also, a masked mesh of the aircraft is created by auto masking the reformed mesh assembly. Moreover, aerodynamics is simulated over the aircraft for the deflected position of the movable aircraft control surface using the masked mesh.

13 Claims, 11 Drawing Sheets

(51) Int. Cl.
  B64C 1/00   (2006.01)
  B64C 3/14   (2006.01)
  B64C 9/32   (2006.01)
  B64C 9/00   (2006.01)
(52) U.S. Cl.
  CPC .............. *B64C 1/0009* (2013.01); *B64C 3/14* (2013.01); *B64C 9/32* (2013.01); *B64C 2009/005* (2013.01); *G06F 2217/16* (2013.01)

(56) References Cited

OTHER PUBLICATIONS

W. Chan, et al., "Best Practices in Overset Grid Generation," 32nd AIAA Fluid Dynamics Conference and Exhibit, Jun. 24-26, 2002, 23 pages.*
R. Kannan, et al., "Overset Adaptive Cartesian/Prism Grid Method for Stationary and Moving-Boundary Flow Problems." AIAA Journal, vol. 45, No. 7, 2007, pp. 1774-1779.*
Ralph W. Noack, "Resolution Appropriate Overset Grid Assembly for Structured and Unstructured Grids," 16th AIAA Computational Fluid Dynamics Conference, Jun. 23-26, 2003, 14 pages.*
I. Chiu, et-al., "On Automating Domain Connectivity for Overset Grids," 33rd Aerospace Sciences Meeting and Exhibit, (AIAA), Jan. 9-12, 1995, 12 pages.*
Z. Wang, et al., "Simulation of Moving Boundary Flow Using Overset Adaptive Cartesian/Prism Grids and DES," Final Performance Report, 2003, Air Force Office of Scientific Research, Arlington, Virginia USA, 21 pages.*
T. Ren, et al., "Vortex Interaction With an Aerofoil Using Chimera and the AMR Algorithm," AIAA Atmospheric Flight Mechanics Conference and Exhibit, Aug. 5-8, 2002, 25 pages.*
C. Wolf, "A Chimera Simulation Method and Detached Eddy Simulation for Vortex-Airfoil Interactions," Doctoral Dissertation, University of Gottingen, 2010, 168 pages.*
F. Blanc, "Patch Assembly: An Automated Overlapping Grid Assembly Strategy," Journal of Aircraft vol. 47, No. 1, Jan.-Feb. 2010, pp. 110-118.*
V. Sankaran, et al., "Overview of the Helios Version 2.0 Computational Platform for Rotorcraft Simulations," 49th AIAA Aerospace Sciences Meeting including the New Horizons Forum and Aerospace Exposition, Jan. 4-7, 2011, 22 pages.*
Benek, J. "A 3-D Chimera Grid Embedding Technique," AIAA Paper No. 85-1523. 1985, 10 pages.*
Togashi F, Nakahashi K, Ito Y, Iwamiya T, Shimbo Y. "Flow Simulation of NAL Experimental Supersonic Airplane/Booster Separation Using Overset Unstructured Grids," Computers & fluids. Jul. 31, 2001; 30(6):673-88.*
Steijl R, Barakos G. "Sliding Mesh Algorithm for CFD Analysis of Helicopter Rotor-Fuselage Aerodynamics," International journal for numerical methods in fluids. Oct. 20, 2008;58(5):527-49.*
Pahlke K, Van Der Wall BG, "Chimera Simulations of Multibladed Rotors in High-Speed Forward Flight With Weak Fluid-Structure-Coupling," Aerospace Science and Technology. Jul. 31, 2005;9(5): 379-89.*
Meakin R.L., "Moving Body Overset Grid Methods for Complete Aircraft Tiltrotor Simulations," AIAA paper. Jul. 6, 1993;3350:1993:576-588.*
W. Liao, et al., "A Multigrid Overset Grid Flow Solver With Implicit Hole Cutting Method," Comput. Methods Appl. Mech. Engrg. 196 (2007):1701-1715.*
Nichols R. H. et al., "Assessment of Store Control Surface Effectiveness in a Non-uniform Aircraft Flow Field", AIAA 97-2200, 15th Applied Aerodynamics Conference, Jun. 23-25, 1997, Atlanta, GA, Sverdrup Technology, Inc., pp. 14.
Jordan J. K. et al., "Coupled VSTOL aircraft and ship airwake turbulent flow simulation model", Final Report for Apr. 2002-Jun. 2002, Jun. 2002, Naval Air Warfare Center Aircraft Division, pp. 63.
Raveh D. E. et al., "Structural optimization using computational aerodynamics", American Institute of Aeronautics and Astronautics, ISSN 0001-1452, 1963, pp. 1.

* cited by examiner

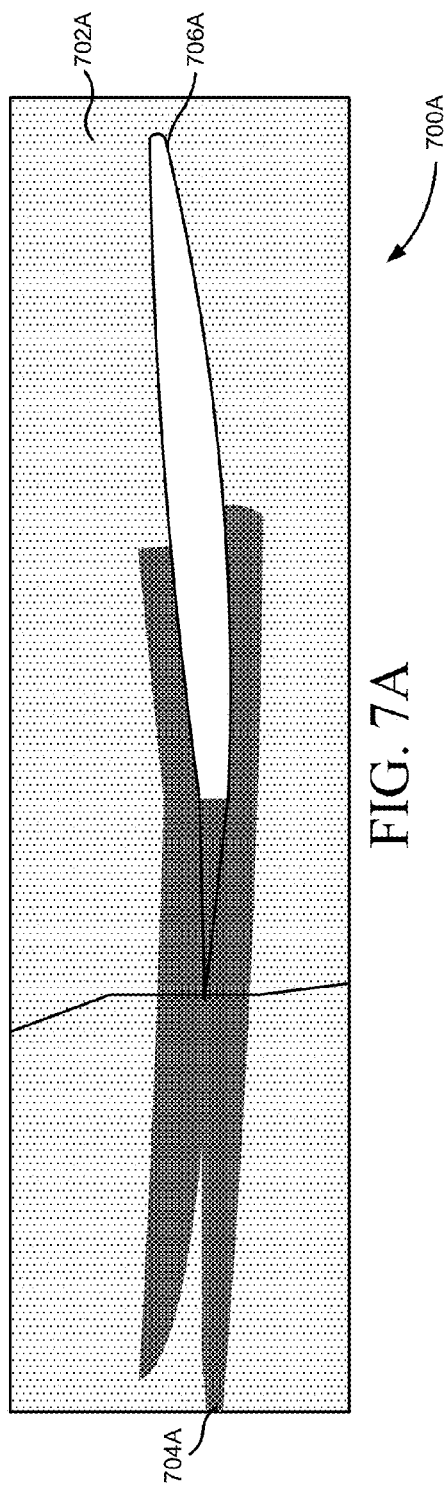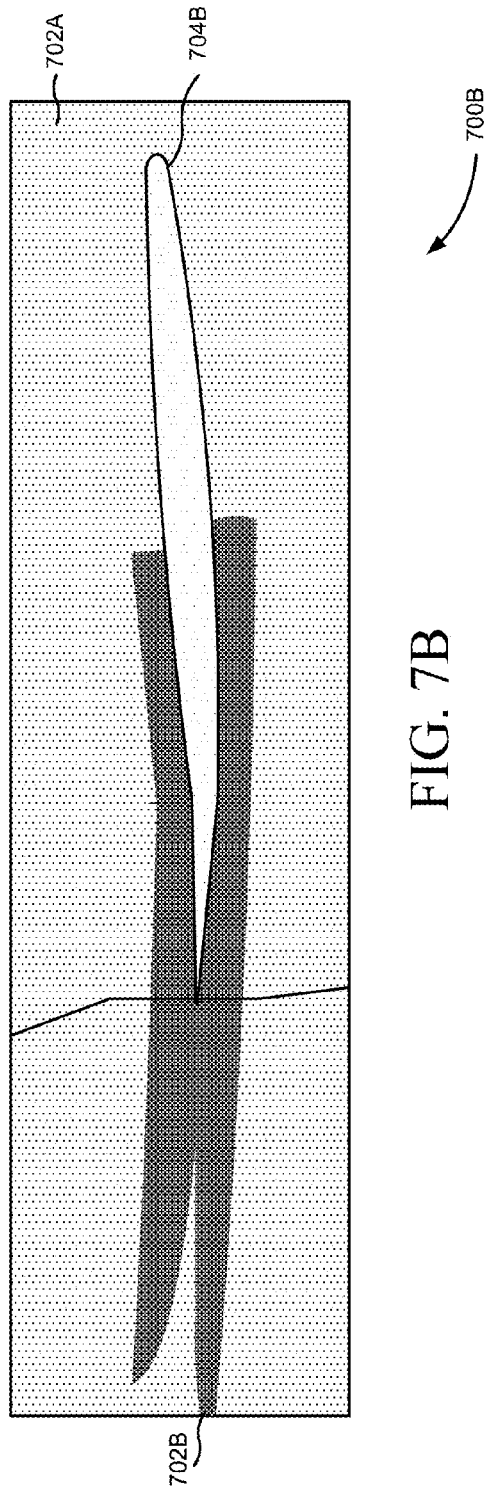
FIG. 7A
FIG. 7B

US 9,600,624 B2

SYSTEM AND METHOD FOR SIMULATING AERODYNAMICS OVER AN AIRCRAFT FOR A DEFLECTED POSITION OF A MOVABLE AIRCRAFT CONTROL SURFACE USING A STRUCTURED CHIMERA MESH

RELATED APPLICATIONS

Benefit is claimed under 35 U.S.C 119(a)-(d) to Foreign Application Serial No. 4194/CHE/2011, filed in INDIA entitled "SYSTEM AND METHOD FOR SIMULATING AERODYNAMICS OVER AN AIRCRAFT FOR A DEFLECTED POSITION OF A MOVABLE AIRCRAFT CONTROL SURFACE USING A STRUCTURED CHIMERA MESH" by Airbus Engineering Centre India, filed on Dec. 2, 2011, which is herein incorporated in its entirety by reference for all purposes.

FIELD OF TECHNOLOGY

Embodiments of the present subject matter relate to computer simulation, and more particularly, to computer simulation of aerodynamics over an aircraft with a movable aircraft control surface.

BACKGROUND

Existing techniques for simulating aerodynamics over an aircraft with movable aircraft control surfaces use a patch mesh or a known coincident mesh (NCT). Exemplary movable aircraft control surfaces include a rudder surface, an elevator surface, an aileron surface and the like. For example, the patch mesh or the NCT is used in a cavity between a horizontal tail plane (HTP) and the elevator surface of an aircraft. For every new deflection of the elevator surface, the patch mesh or the NCT needs to be regenerated manually for the elevator surface, other aircraft components and ambient air. This can be very time consuming and not practical.

SUMMARY

A system and method for simulating aerodynamics over an aircraft for a deflected position of a movable aircraft control surface using a structured chimera mesh are disclosed. According to one aspect of the present subject matter, a mesh assembly of the aircraft is created by overlapping a background mesh and a structured chimera mesh for the deflected position of the movable aircraft control surface. Further, mesh cell sizes within overlapping boundaries of the background mesh and the structured chimera mesh are analyzed. Furthermore, the structured chimera mesh is regenerated based on the analysis. In addition, the mesh assembly of the aircraft is reformed based on the regenerated structured chimera mesh. Also, a masked mesh of the aircraft is created by auto masking the reformed mesh assembly. Moreover, aerodynamics is simulated over the aircraft for the deflected position of the movable aircraft control surface using the masked mesh.

According to another aspect of the present subject matter, the system to simulate aerodynamics over the aircraft for the deflected position of the movable aircraft control surface using the structured chimera mesh includes a processor and a memory coupled to the processor. Further, the memory includes an aerodynamics simulation tool. In one embodiment, the aerodynamics simulation tool includes instructions to perform the method described above.

According to yet another aspect of the present subject matter, a non-transitory computer-readable storage medium for simulating aerodynamics over the aircraft for the deflected position of the movable aircraft control surface using the structured chimera mesh having instructions that, when executed by a computing device, cause the computing device to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein:

FIGS. 7A and 7B are volume cut sectional views of portions of the mesh assembly and the masked mesh formed before and after auto masking, respectively, around the elevator surface with an overlapping region on a horizontal tail plane (HTP), according to one embodiment;

FIGS. 9A-9J illustrate graphs showing $C_P$ distributions obtained over different span-wise HTP sections, for the mach number of 0.85 and the AOA of 2 degrees, after performing the aerodynamics simulation over the upper and lower HTPs using the masked mesh, according to one embodiment.

The drawings described herein are for illustration purposes only and are not intended to limit the scope of the present disclosure in any way.

DETAILED DESCRIPTION

A system and method for simulating aerodynamics over an aircraft for a deflected position of a movable aircraft control surface using a structured chimera mesh are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
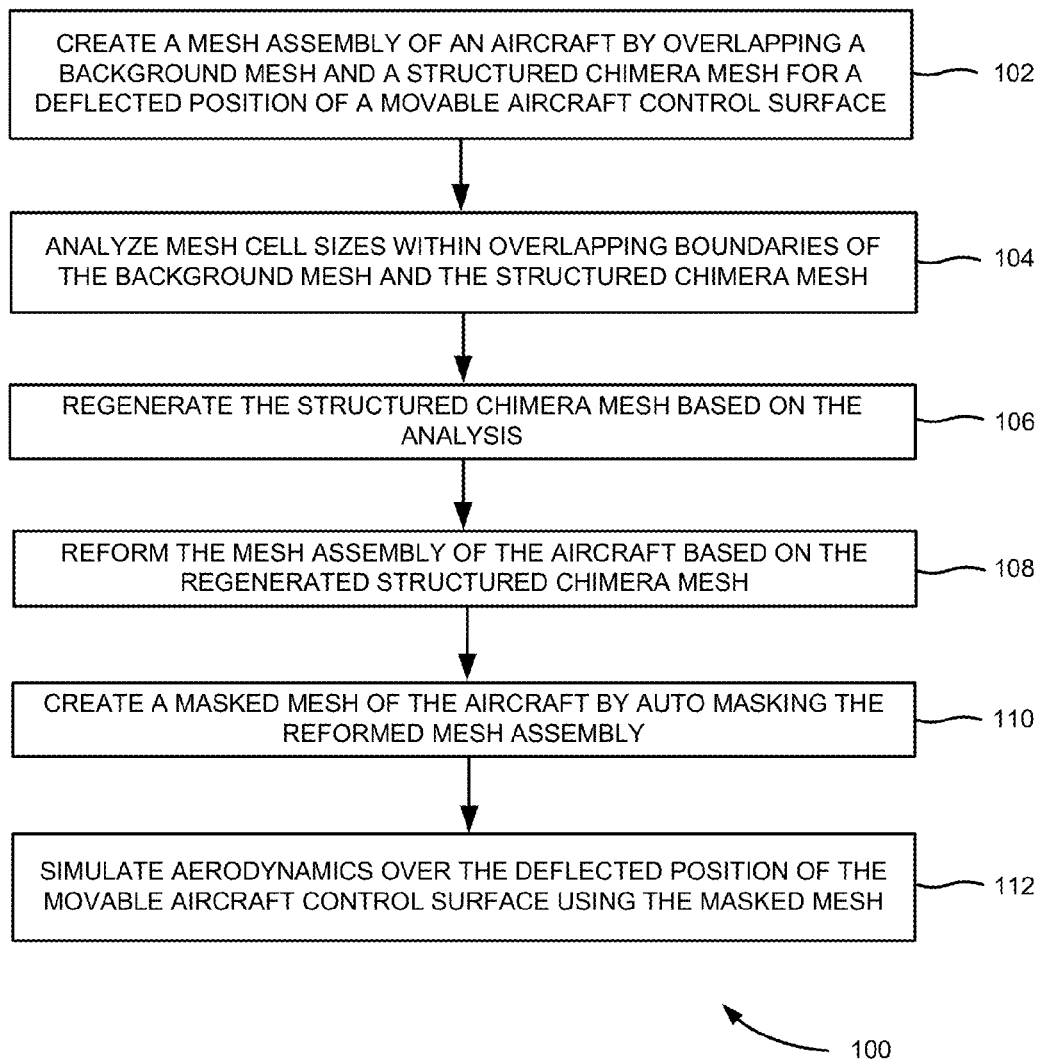
FIG. 1 illustrates a flow diagram of an exemplary method to simulate aerodynamics over an aircraft for a deflected position of a movable aircraft control surface using a structured chimera mesh.

FIG. 1 illustrates a flow diagram 100 of an exemplary method to simulate aerodynamics over an aircraft for a deflected position of a movable aircraft control surface using a structured chimera mesh. Exemplary movable aircraft control surface includes a rudder surface, an elevator surface, an aileron surface and the like. At block 102, a mesh assembly of the aircraft is created by overlapping a background mesh and a structured chimera mesh for the deflected position of the movable aircraft control surface. In one embodiment, the background mesh including a movable aircraft control surface cavity associated with the movable aircraft control surface requiring simulation of aerodynamics is created. This is explained below in more detail with reference to FIG. 2. Further, overlapping boundaries between the background mesh and the deflected position of the movable aircraft control surface are defined. Furthermore, the structured chimera mesh is created for the deflected position of the movable aircraft control surface based on the defined overlapping boundaries. This is explained below in more detail with reference to FIG. 3. The background mesh and the structured chimera mesh are then overlapped to create the mesh assembly of the aircraft. This is explained below in more detail with reference to FIGS. 4 and 5.

At block 104, mesh cell sizes within the overlapping boundaries of the background mesh and the structured chimera mesh are analyzed. In one embodiment, the mesh cell sizes within the overlapping boundaries are analyzed by comparing a ratio of mesh cell sizes of the background mesh and the structured chimera mesh within the overlapping boundaries with a predetermined threshold ratio.

At block 106, the structured chimera mesh is regenerated based on the analysis. At block 108, the mesh assembly of the aircraft is reformed based on the regenerated structured chimera mesh. At block 110, a masked mesh of the aircraft is created by auto masking the reformed mesh assembly. In context, donor and interpolated mesh cells are identified in the reformed mesh assembly. This is explained below in more detail with reference to FIG. 5. Further, the reformed mesh assembly is auto masked using the identified donor and interpolated mesh cells to create the masked mesh. This is explained below in more detail with reference to FIGS. 6, 7A and 7B.

At block 112, aerodynamics is simulated over the aircraft for the deflected position of the movable aircraft control surface using the masked mesh. The above acts, at blocks 102 to 112, are repeated for a next deflected position of the movable aircraft control surface.

Figure 2:
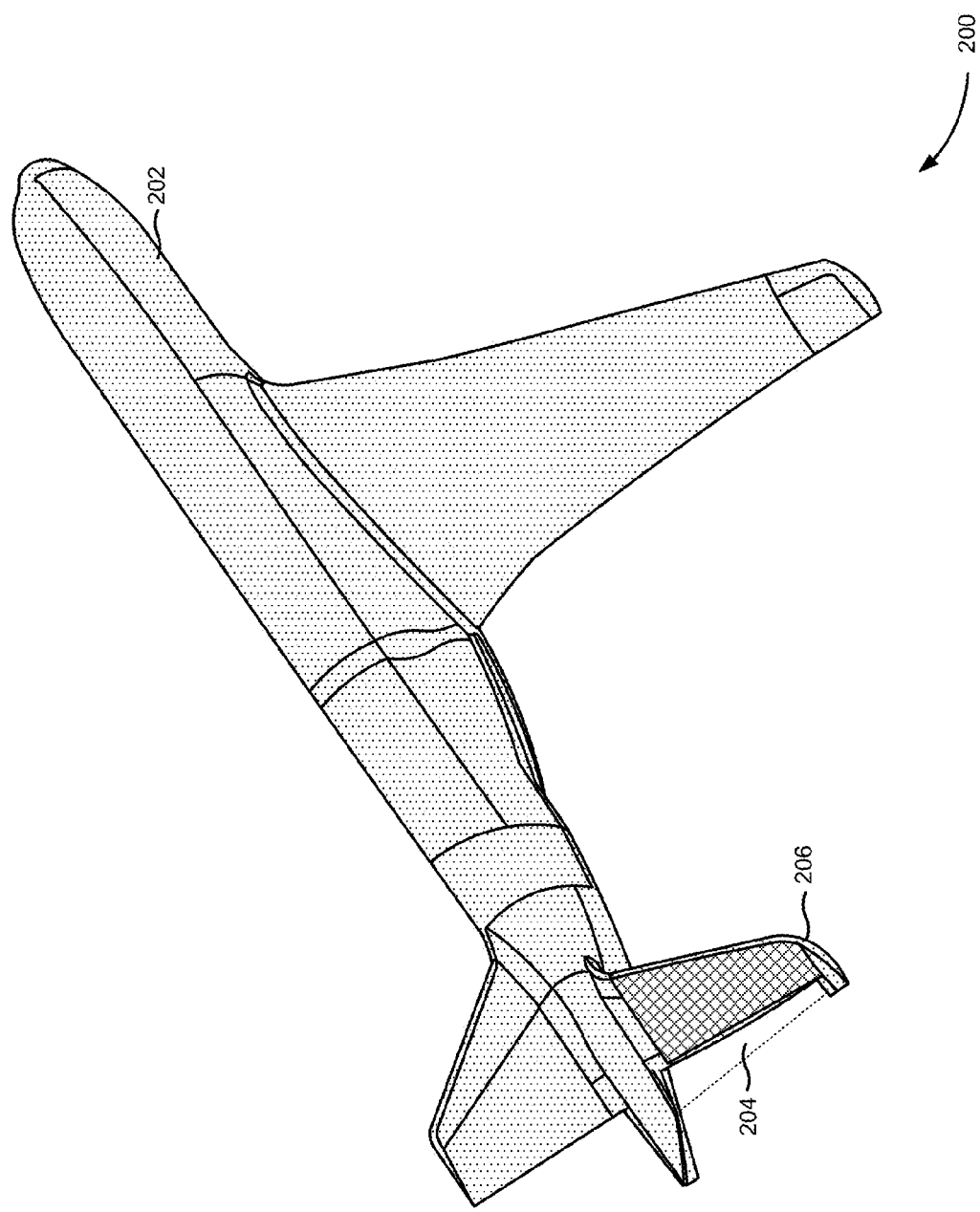
FIG. 2 is a perspective view of an example background mesh of an aircraft.

Referring now to FIG. 2, which illustrates a perspective view of an example background mesh 200 of an aircraft. Particularly, FIG. 2 illustrates the background mesh 200 including a mesh 202 and a movable aircraft control surface cavity 204. The movable aircraft control surface cavity 204 is associated with the movable aircraft control surface requiring simulation of aerodynamics. Exemplary movable aircraft control surface includes a rudder surface, an elevator surface, an aileron surface and the like. In this embodiment, the movable aircraft control surface cavity 204 is on a horizontal tail plane (HTP) 206 of the aircraft. In an exemplary implementation, the background mesh 200 including the movable aircraft control surface cavity 204 is created using a computational fluid dynamics (CFD) simulation.

Figure 3:
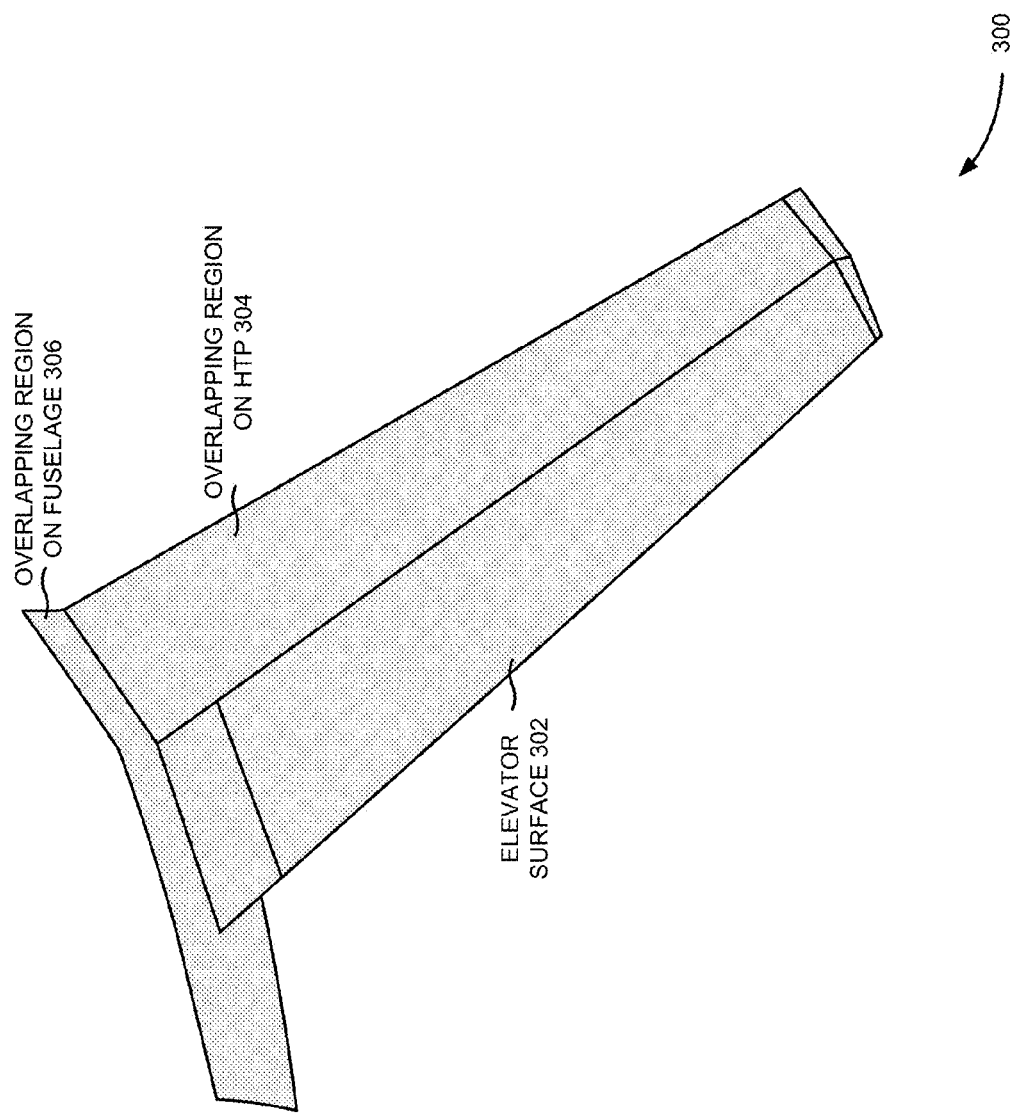
FIG. 3 is a perspective view of a structured chimera mesh formed for the movable aircraft control surface, such as an elevator surface having a deflection of about 15 degrees, according to one embodiment.

Referring now to FIG. 3, which illustrates a perspective view of a structured chimera mesh 300 formed for the movable aircraft control surface, such as an elevator surface 302 having a deflection of about 15 degrees, according to one embodiment. As shown in FIG. 3, the structured chimera mesh 300 includes the elevator surface 302, an overlapping region on HTP 304, and an overlapping region on fuselage 306. The overlapping region on HTP 304 is the region of the structured chimera mesh 300 which overlaps on the background mesh 200 of the HTP 206, shown in FIG. 2, and the overlapping region on fuselage 306 is the region of the structured chimera mesh 300 which overlaps on the background mesh 200 of a fuselage of the aircraft. In one embodiment, the structured chimera mesh 300 is created based on defined overlapping boundaries. For example, the overlapping boundaries are defined between the background mesh 200 and the deflected position of the elevator surface 302. The overlapping boundaries include dimensions of the overlapping region on HTP 304 and the overlapping region on fuselage 306 which are defined based on a configuration of the aircraft and a density of the background mesh 200.

For example, the structured chimera mesh 300 is obtained using a chimera methodology. The chimera methodology allows meshing of the deflected position of the elevator surface 302 separately to generate the structured chimera mesh 300. Meshing of the deflected position of the elevator surface 302 separately from the background mesh 200 substantially minimizes modifications required in the structured chimera mesh 300 for a next deflected position of the elevator surface. Also, a majority of the background mesh 200 remains fixed for the next deflected position of the elevator surface. In some embodiments, the overlapping boundaries between the background mesh 200 and the deflected position of the elevator surface 302 remains fixed for the next deflected position of the elevator surface.

Figure 4:
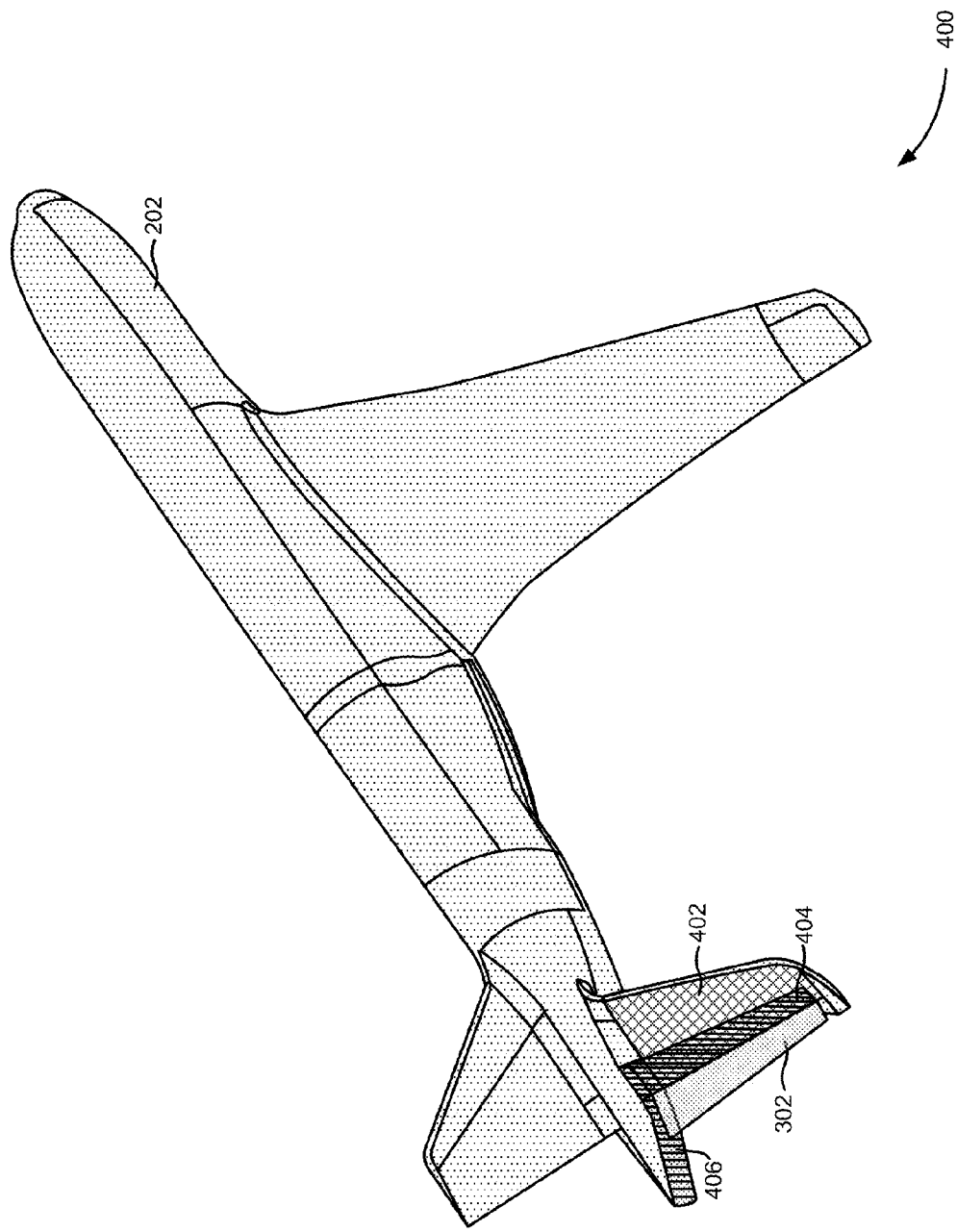
FIG. 4 is a perspective view of a mesh assembly formed after overlapping the background mesh and the structured chimera mesh, such as those shown in FIGS. 2 and 3, according to one embodiment.

Referring now to FIG. 4, which illustrates a perspective view of a mesh assembly 400 formed by overlapping the background mesh 200 and the structured chimera mesh 300, such as those shown in FIGS. 2 and 3, according to one embodiment. As shown, FIG. 4 illustrates a mesh 402 which is a portion of the HTP 206, shown in FIG. 2, not overlapping with the structured chimera mesh 300. Further, FIG. 4 illustrates a mesh 404 formed by overlapping the overlapping region on HTP 304, shown in FIG. 3, with the background mesh 200. Furthermore, FIG. 4 illustrates a mesh 406 formed by overlapping the overlapping region on fuselage 306, shown in FIG. 3, with the background mesh 200. In addition, FIG. 4 illustrates the deflected position of the elevator surface 302, shown in FIG. 3, which is not overlapping with the background mesh 200.

Figure 5:
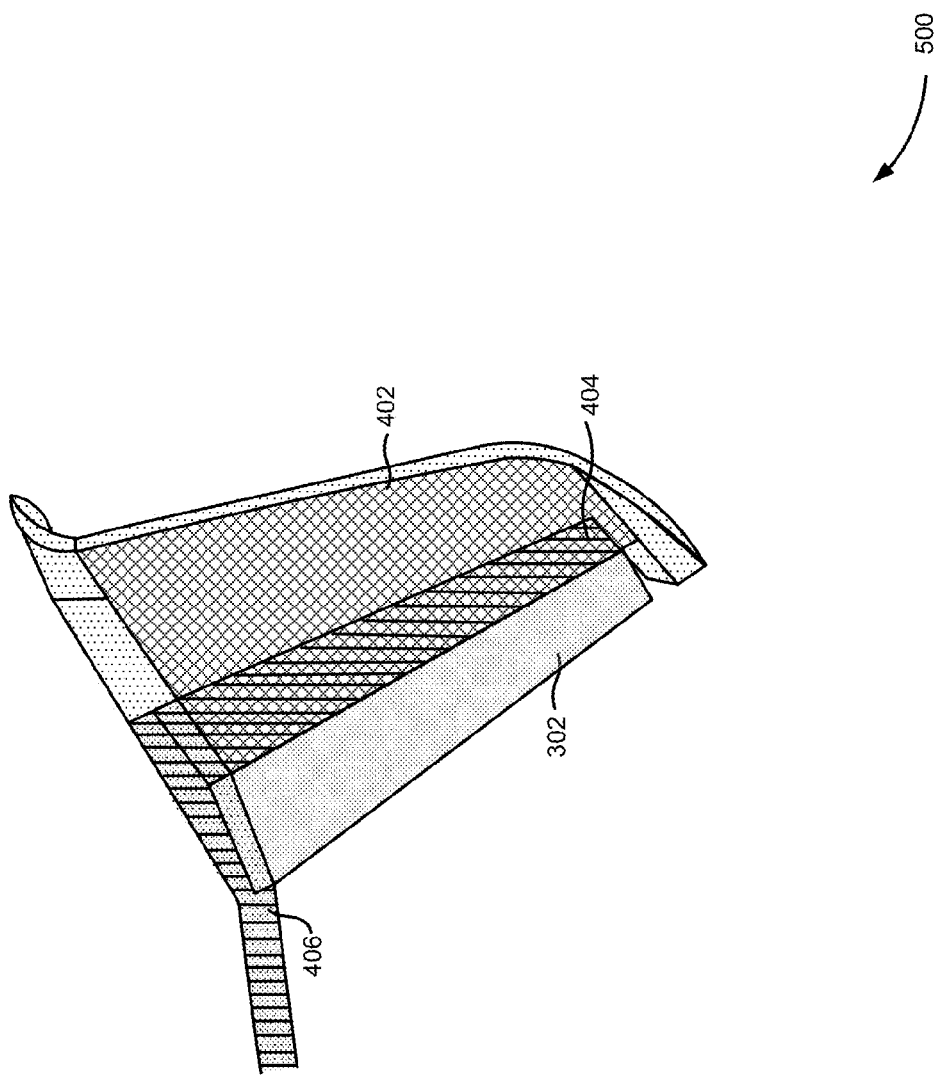
FIG. 5 is an expanded perspective view of rear end portion of the aircraft including a portion of the mesh assembly, such as the one shown in FIG. 4, according to one embodiment.

Referring now to FIG. 5, which illustrates an expanded perspective view of rear end portion of the aircraft including a portion of the mesh assembly 400, such as the one shown in FIG. 4, according to one embodiment. Particularly, FIG. 5 illustrates the meshes 402, 404, and 406 formed by overlapping the background mesh 200 and the structured chimera mesh 300, such as those shown in FIGS. 2 and 3, and the deflected position of the elevator surface 302. This is explained above, in more detail, with reference to FIG. 4.

In operation, mesh cell sizes within the overlapping boundaries of the background mesh 200 and the structured chimera mesh 300 are analyzed. In other words, the mesh cell sizes of the background mesh 200 and the structured chimera mesh 300 in the meshes 404 and 406 are analyzed. In one embodiment, a ratio of the mesh cell sizes of the background mesh 200 and the structured chimera mesh 300 within the overlapping boundaries are compared with a predetermined threshold ratio. Further, the structured chimera mesh 300, shown in FIG. 3, is regenerated based on the analysis, if the ratio of the analyzed mesh cell sizes exceeds the predetermined threshold ratio. Further, the mesh assembly 400, shown in FIG. 4, of the aircraft is reformed based on the regenerated structured chimera mesh. Furthermore, donor and interpolated mesh cells are identified in the reformed mesh assembly.

In one embodiment, the donor and interpolated mesh cells are identified using a patch assembly method. The donor mesh cells are mesh cells associated with the background mesh 200 and the interpolated mesh cells are mesh cells associated with the structured chimera mesh 300. Further, the donor and interpolated mesh cells are used to communicate fluid flow information obtained from the CFD simulation. For example, the interpolated mesh cells use the donor mesh cells to interpolate the fluid flow information.

Further in operation, the reformed mesh assembly is auto masked using the computed donor and interpolated mesh cells to create a masked mesh. In one embodiment, the reformed mesh assembly is auto masked using the patch assembly method. This is explained below in more detail with reference to FIG. 6.

Figure 6:
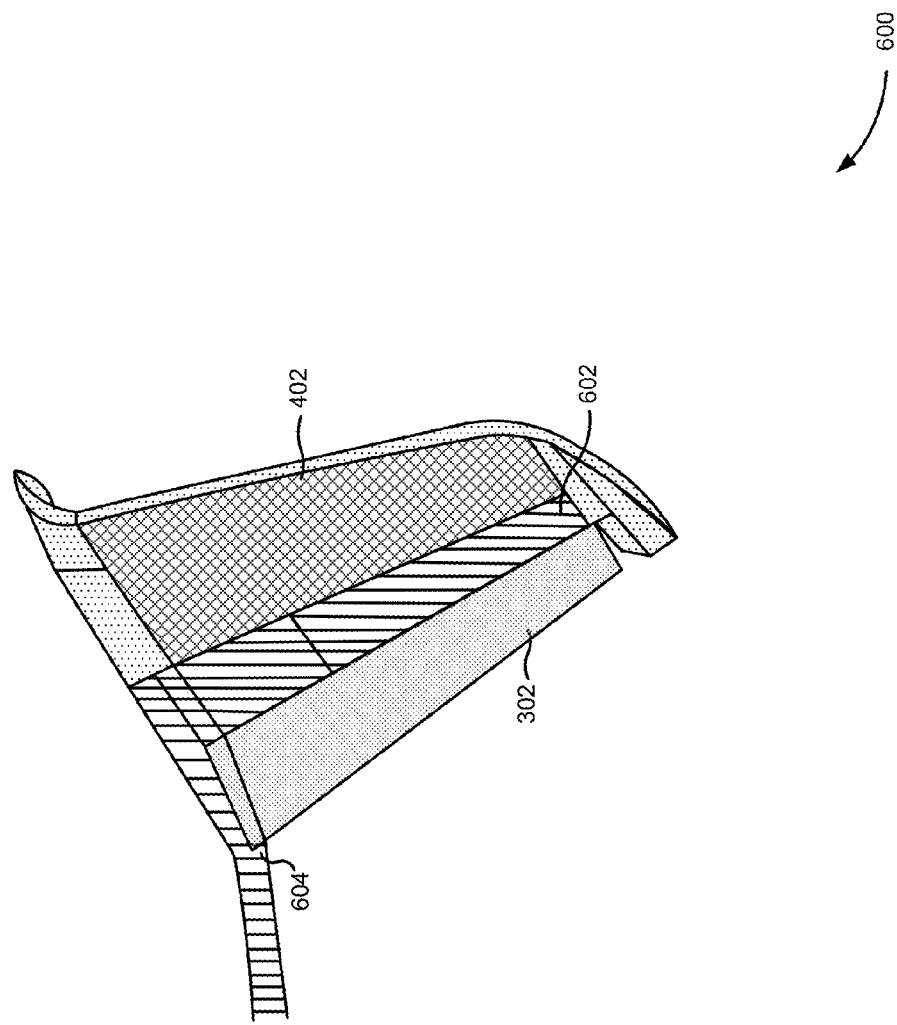
FIG. 6 is a perspective view of the rear end portion of the aircraft including a portion of a masked mesh formed after auto masking the mesh assembly, such as the one shown in FIG. 4, according to one embodiment.

Referring now to FIG. 6, which illustrates a perspective view of a rear end portion of the aircraft including a portion of masked mesh 600 formed after auto masking the reformed mesh assembly, such as the one shown in FIG. 4, according to one embodiment. Particularly, FIG. 6 illustrates the portion of the masked mesh 600 formed after auto masking the reformed mesh assembly using the patch assembly method. During auto masking, mesh cells in overlapping regions between the background mesh 200 and the structured chimera mesh 300, such as the meshes 404 and 406, shown in FIG. 4, are reduced by deactivating the mesh cells in the meshes 404 and 406. Further, the mesh cells in the meshes 404 and 406 are deactivated to reduce mesh cell count and to obtain an optimum mesh cell count. As a result of auto masking, meshes 602 and 604 with reduced mesh cell count are obtained in the overlapping regions between the background mesh 200 and the structured chimera mesh 300. In operation, the masked mesh of the aircraft is used to simulate aerodynamics over the aircraft for the deflected position of the elevator surface 302.

Referring now to FIGS. 7A and 7B, which illustrate volume cut sectional views 700A and 700B, respectively, of portions of the mesh assembly and the masked mesh formed before and after auto masking, respectively, around the deflected position of the elevator surface 302 with the overlapping region on HTP 304, according to one embodiment. Particularly, FIG. 7A illustrates the volume cut sectional view 700A of the portion of the mesh assembly formed before auto masking. As shown in FIG. 7A, a mesh 702A illustrates a portion of the background mesh 200, a mesh 704A illustrates a portion of the overlapping region of the structured chimera mesh 300 and the background mesh 200, and 706A illustrates a volume cut sectional view of the deflected position of the elevator surface 302. Further as shown in FIG. 7A, some mesh cells of the mesh 704A are inside the volume cut sectional view of the elevator surface 706A.

Particularly, FIG. 7B illustrates the volume cut sectional view 700B of the portion of the mesh assembly formed after auto masking. As shown in FIG. 7B, the mesh 702A illustrates the portion of the background mesh 200. Further as shown in FIG. 7B, the cells in the mesh 704A inside the volume cut sectional view of the elevator surface 706A, shown in FIG. 7A are deactivated and thus results in a mesh 702B. Furthermore as shown in FIG. 7B, 704B illustrates the volume cut sectional view of the deflected position of the elevator surface 302, shown in FIG. 3, with reduced overlapping regions obtained after auto masking.

Figure 8:
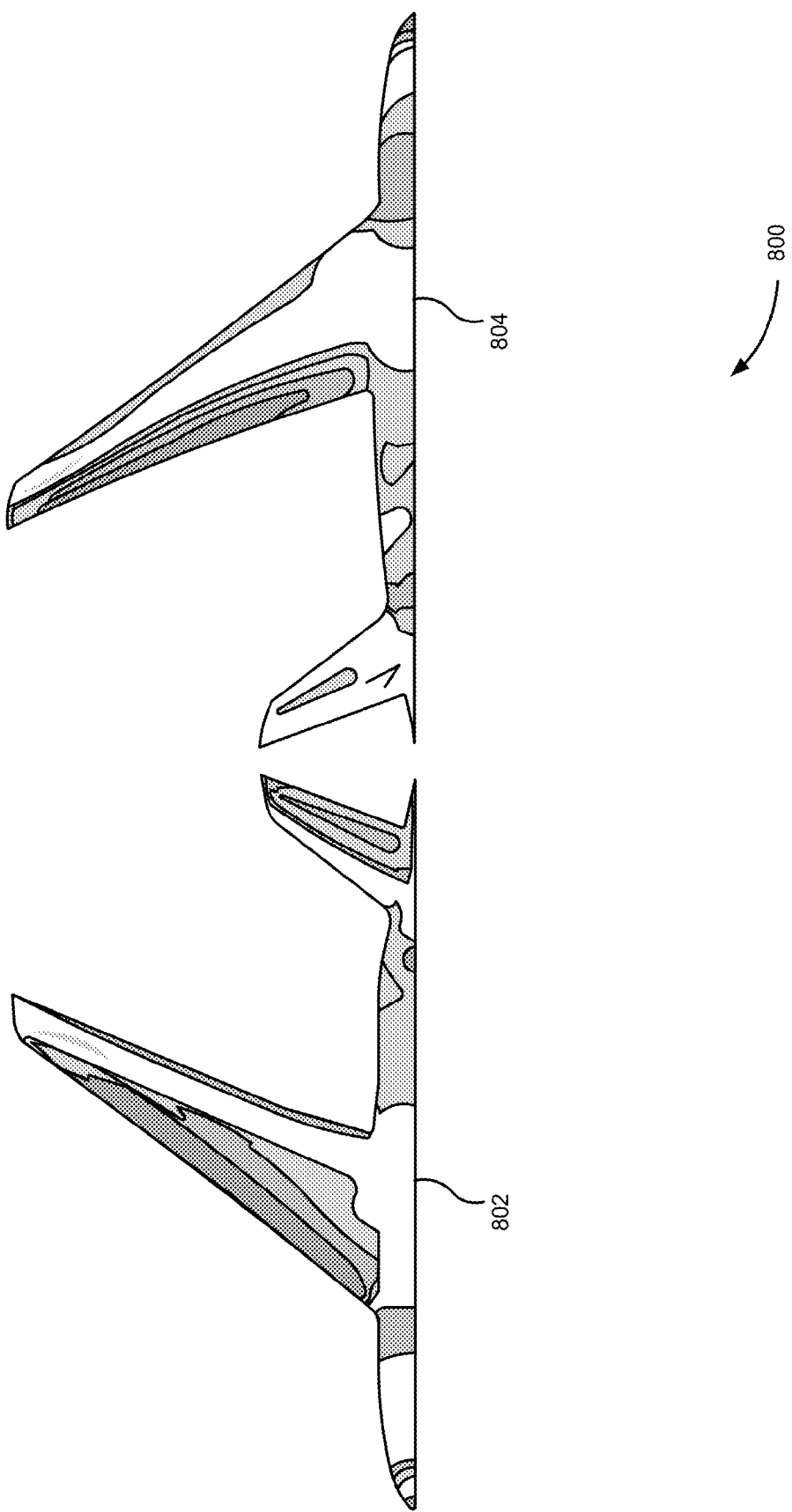
FIG. 8 illustrates co-efficient of pressure ($C_P$) distribution obtained across upper and lower HTPs, for a mach number of 0.85 and an angle of attack (AOA) of 2 degrees, after performing aerodynamics simulation over the upper and lower HTPs using the masked mesh, according to one embodiment.
Figure 9A:
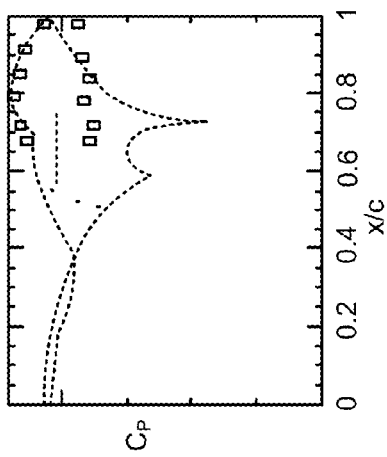
Figure 9B:
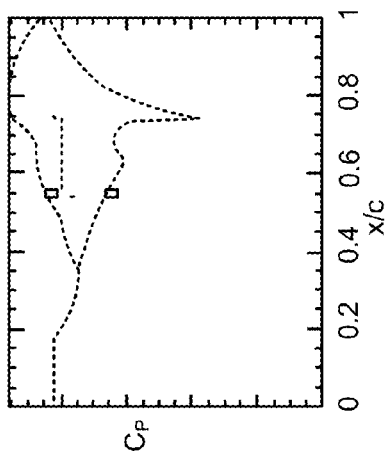
Figure 9C:
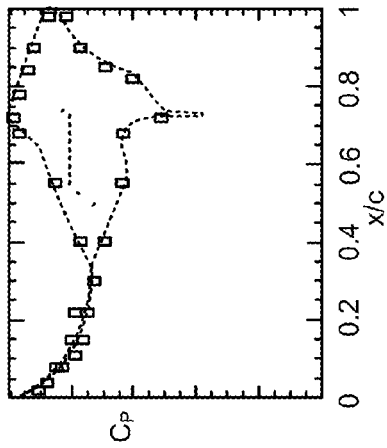
Figure 9E:
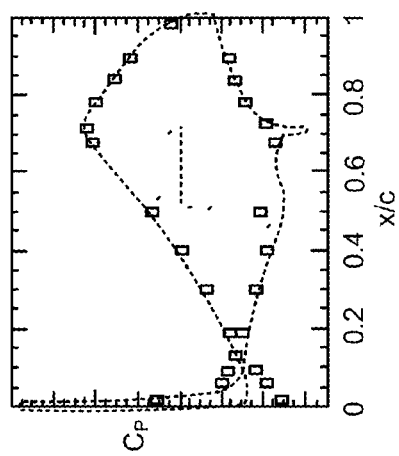
Figure 9F:
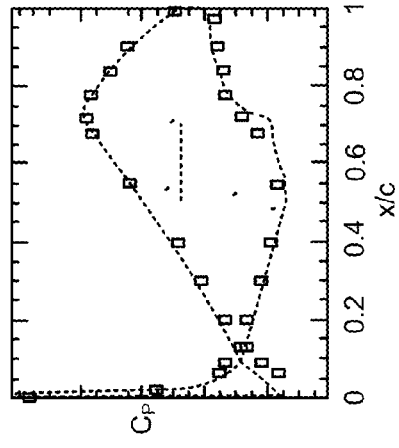
Figure 9I:
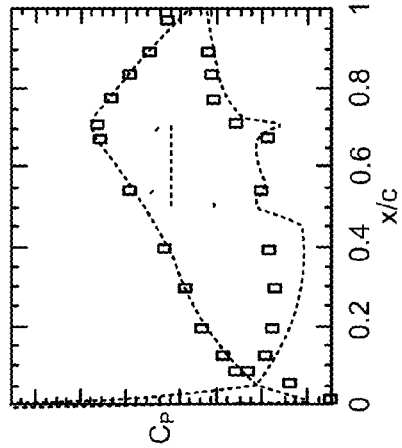
Figure 9H:
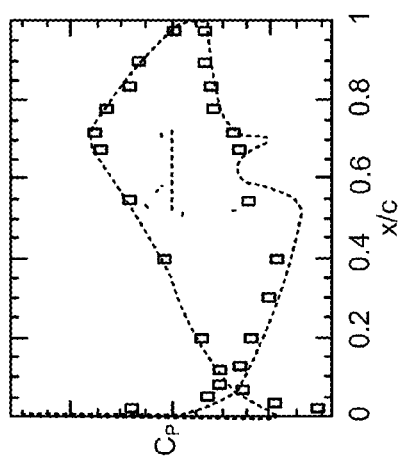
Figure 9G:
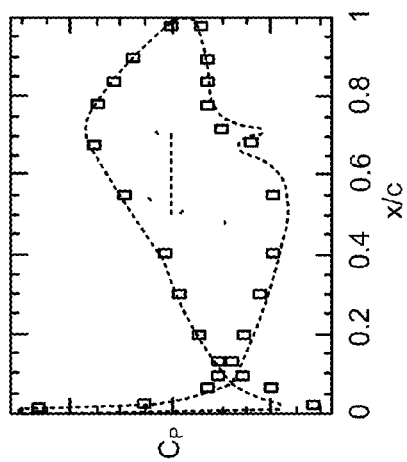
Figure 9J:
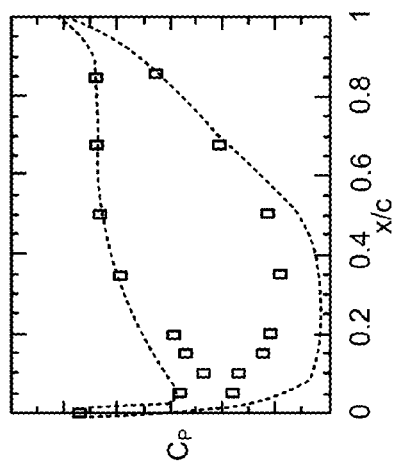

Referring now to FIG. 8, which illustrates co-efficient of pressure ($C_P$) distribution obtained across an upper HTP 802 and a lower HTP 804, for a mach number of 0.85 and an angle of attack (AOA) of 2 degrees, after performing aerodynamics simulation over the aircraft using the masked mesh, according to one embodiment. Particularly, FIG. 8 illustrates pressure distribution in the upper HTP 802 and the lower HTP 804. The different shades shown in the upper HTP 802 and the lower HTP 804 indicate the resulting variations in pressure obtained during aerodynamics simulation over the aircraft using the masked mesh.

Referring now to graphs in FIGS. 9A-9J, which illustrate $C_P$ distributions obtained over different span-wise HTP sections, for the mach number of 0.85 and the AOA of 2 degrees, after performing the aerodynamics simulation over the aircraft using the masked mesh, according to one embodiment. Each of the graphs illustrated in FIGS. 9A-9J indicate the accuracy of the above described simulation method by comparing results obtained from the CFD simulation and experimental values. In each of the graphs illustrated in FIGS. 9A-9J, the x-axis represents x/c, which is a distance 'x' from a leading edge of the HTP 206 normalized with respect to a chord length 'c' and the y-axis represents $C_P$.

Figure 10:
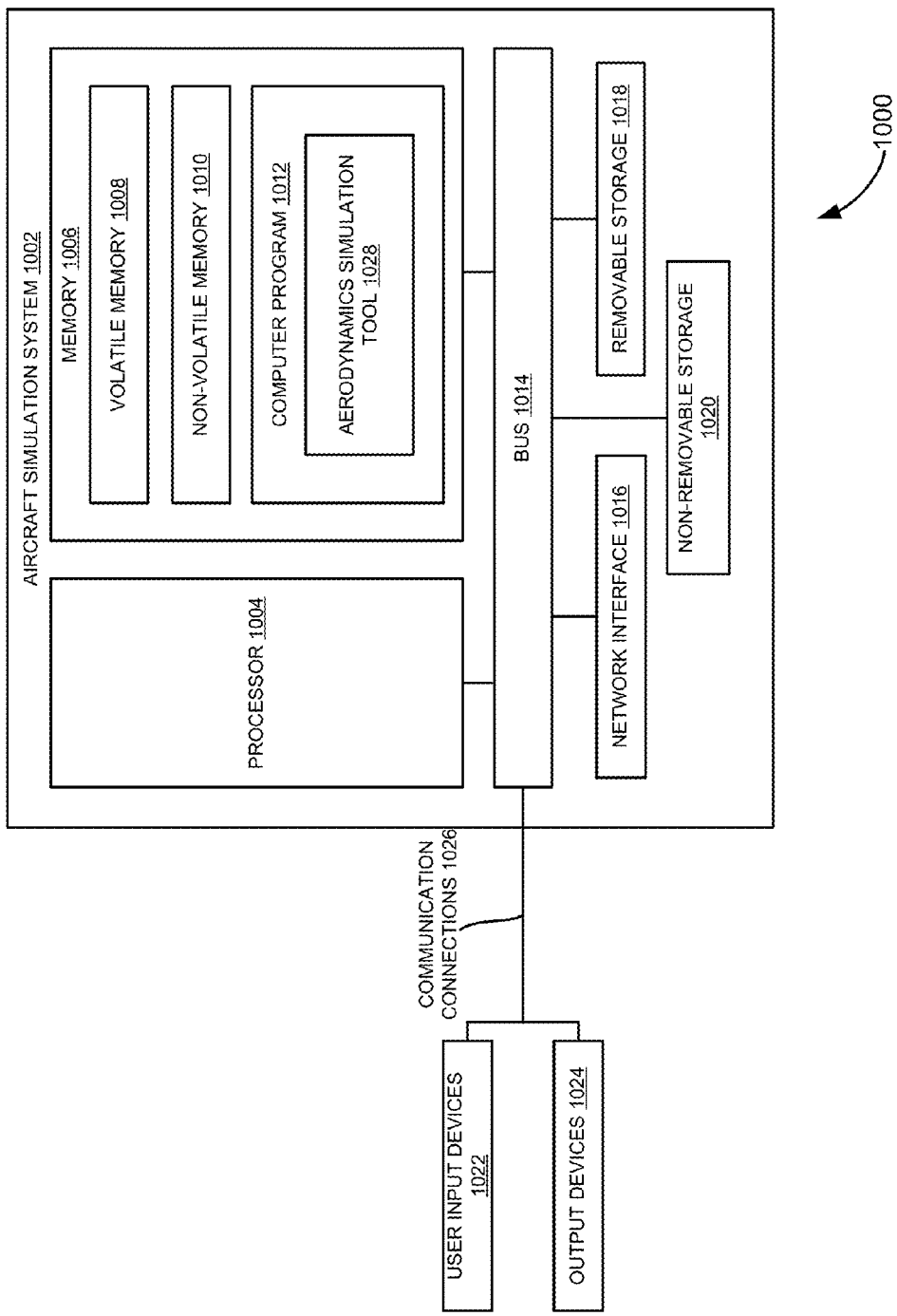
FIG. 10 illustrates a system including an aerodynamics simulation tool for simulating aerodynamics over the aircraft for the deflected position of the movable aircraft control surface using the structured chimera mesh, using the process shown in FIG. 1, according to one embodiment.

Referring now to FIG. 10, which illustrates an aircraft simulation system 1002 including an aerodynamics simulation tool 1028 for simulating aerodynamics over an aircraft for a deflected position of a movable aircraft control surface using a structured chimera mesh, using the process shown in FIG. 1, according to one embodiment. FIG. 10 and the following discussions are intended to provide a brief, general description of a suitable computing environment in which certain embodiments of the inventive concepts contained herein are implemented.

The aircraft simulation system 1002 includes a processor 1004, memory 1006, a removable storage 1018, and a non-removable storage 1020. The aircraft simulation system 1002 additionally includes a bus 1014 and a network interface 1016. As shown in FIG. 10, the aircraft simulation system 1002 includes access to the computing system environment 1000 that includes one or more user input devices 1022, one or more output devices 1024, and one or more communication connections 1026, such as a network interface card and/or a universal serial bus connection.

Exemplary user input devices 1022 include a digitizer screen, a stylus, a trackball, a keyboard, a keypad, a mouse and the like. Exemplary output devices 1024 include a display unit of the personal computer, a mobile device, and the like. Exemplary communication connections 1026 include a local area network, a wide area network, and/or other network.

The memory 1006 further includes volatile memory 1008 and non-volatile memory 1010. A variety of computer-readable storage media are stored in and accessed from the memory elements of the aircraft simulation system 1002, such as the volatile memory 1008 and the non-volatile memory 1010, the removable storage 1018 and the non-removable storage 1020. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 1004, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1004 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 1004 of the aircraft simulation system 1002. For example, a computer program 1012 includes machine-readable instructions capable of simulating aerodynamics over the aircraft for the deflected position of the movable aircraft control surface using the structured chimera mesh in the aircraft simulation system 1002, according to the teachings and herein described embodiments of the present subject matter. In one embodiment, the computer program 1012 is included on a compact disk-read only memory (CD-ROM) and loaded from the CD-ROM to a hard drive in the non-volatile memory 1010. The machine-readable instructions cause the aircraft simulation system 1002 to encode according to the various embodiments of the present subject matter.

As shown, the computer program 1012 includes the aerodynamics simulation tool 1028. For example, the aerodynamics simulation tool 1028 can be in the form of instructions stored on a non-transitory computer-readable storage medium. The non-transitory computer-readable storage medium having the instructions that, when executed by the aircraft simulation system 1002, causes the aircraft simulation system 1002 to perform the one or more methods described with reference to FIGS. 1 through 9.

In various embodiments, the methods and systems described in FIGS. 1 through 10 enable to separately mesh the movable aircraft control surface requiring simulation of aerodynamics, using the chimera methodology. Further, for every new deflection of the movable aircraft control surface the generated mesh can be easily modified without modifying the background mesh.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A computer implemented method to simulate aerodynamics over an aircraft for a deflected position of a movable aircraft control surface using a structured chimera mesh, comprising:
   creating, by an aerodynamics simulation tool residing in a memory, a mesh assembly of the aircraft by overlapping a background mesh and a structured chimera mesh for the deflected position of the movable aircraft control surface;
   analyzing, by the aerodynamics simulation tool, mesh cell sizes within overlapping boundaries of the background mesh and the structured chimera mesh, wherein analyzing the mesh cell sizes comprises:
      comparing a ratio of the mesh cell sizes of the background mesh and the structured chimera mesh within the overlapping boundaries with a predetermined threshold ratio;
   regenerating, by the aerodynamics simulation tool, the structured chimera mesh for the deflected position of the movable aircraft control surface when the ratio of the mesh cell sizes exceeds the predetermined threshold ratio;
   reforming, by the aerodynamics simulation tool, the mesh assembly of the aircraft based on the regenerated structured chimera mesh;
   creating, by the aerodynamics simulation tool, a masked mesh of the aircraft by auto masking the reformed mesh assembly using a patch assembly method; and
   simulating, by the aerodynamics simulation tool, aerodynamics over the aircraft for the deflected position of the movable aircraft control surface using the masked mesh.

2. The method of claim 1, wherein creating the masked mesh of the aircraft by auto masking the reformed mesh assembly comprises:
   identifying donor and interpolated mesh cells in the reformed mesh assembly; and
   auto masking the reformed mesh assembly using the identified donor and interpolated mesh cells to create the masked mesh of the aircraft.

3. The method of claim 1, wherein creating the mesh assembly of the aircraft by overlapping the background mesh and the structured chimera mesh for the deflected position of the movable aircraft control surface comprises:
   creating the background mesh including a movable aircraft control surface cavity associated with the movable aircraft control surface requiring simulation of aerodynamics;
   defining the overlapping boundaries between the background mesh and the deflected position of the movable aircraft control surface;
   creating the structured chimera mesh for the deflected position of the movable aircraft control surface based on the defined overlapping boundaries; and
   overlapping the background mesh and the structured chimera mesh to create the mesh assembly of the aircraft.

4. The method of claim 1, wherein the movable aircraft control surface is selected from a group consisting of a rudder surface, an elevator surface and an aileron surface.

5. The method of claim 1, further comprising repeating the steps of claim 1 for a new deflected position of the movable aircraft control surface, wherein regenerating the structured chimera mesh for the new deflected position of the movable aircraft control surface separately from the background mesh substantially minimizes modifications to the regenerated structured chimera mesh for the new deflected position of the movable aircraft control surface.

6. A system to simulate aerodynamics over an aircraft for a deflected position of a movable aircraft control surface using a structured chimera mesh, comprising:
a processor; and
memory coupled to the processor, wherein the memory includes an aerodynamics simulation tool having instructions that are executed by the processor to:
create a mesh assembly of the aircraft by overlapping a background mesh and a structured chimera mesh for the deflected position of the movable aircraft control surface;
analyze mesh cell sizes within overlapping boundaries of the background mesh and the structured chimera mesh, wherein analyzing the mesh cell sizes comprises:
comparing a ratio of the mesh cell sizes of the background mesh and the structured chimera mesh within the overlapping boundaries with a predetermined threshold ratio;
regenerate the structured chimera mesh for the deflected position of the movable aircraft control surface when the ratio of the mesh cell sizes exceeds the predetermined threshold ratio;
reform the mesh assembly of the aircraft based on the regenerated structured chimera mesh;
create a masked mesh of the aircraft by auto masking the reformed mesh assembly using a patch assembly method; and
simulate aerodynamics over the aircraft for the deflected position of the movable aircraft control surface using the masked mesh.

7. The system of claim 6, wherein the aerodynamics simulation tool further has instructions to:
identify donor and interpolated mesh cells in the reformed mesh assembly; and
auto mask the reformed mesh assembly using the identified donor and interpolated mesh cells to create the masked mesh of the aircraft.

8. The system of claim 6, wherein the aerodynamics simulation tool further has instructions to:
create the background mesh of the aircraft including a movable aircraft control surface cavity associated with the movable aircraft control surface requiring simulation of aerodynamics;
define the overlapping boundaries between the background mesh and the deflected position of the movable aircraft control surface;
create the structured chimera mesh for the deflected position of the movable aircraft control surface based on the defined overlapping boundaries; and
overlap the background mesh and the structured chimera mesh to create the mesh assembly of the aircraft.

9. The system of claim 6, wherein the movable aircraft control surface is selected from a group consisting of a rudder surface, an elevator surface and an aileron surface.

10. A non-transitory computer-readable storage medium for simulating aerodynamics over an aircraft for a deflected position of a movable aircraft control surface using a structured chimera mesh, having instructions that, when executed by a computing device cause the computing device to:
create a mesh assembly of the aircraft by overlapping a background mesh and a structured chimera mesh for the deflected position of the movable aircraft control surface;
analyze mesh cell sizes within overlapping boundaries of the background mesh and the structured chimera mesh, wherein analyzing the mesh cell sizes comprises:
comparing a ratio of the mesh cell sizes of the background mesh and the structured chimera mesh within the overlapping boundaries with a predetermined threshold ratio;
regenerate the structured chimera mesh for the deflected position of the movable aircraft control surface when the ratio of the mesh cell sizes exceeds the predetermined threshold ratio;
reform the mesh assembly of the aircraft based on the regenerated structured chimera mesh;
create a masked mesh of the aircraft by auto masking the reformed mesh assembly using a patch assembly method; and
simulate aerodynamics over the aircraft for the deflected position of the movable aircraft control surface using the masked mesh.

11. The non-transitory computer-readable storage medium of claim 10, wherein creating the masked mesh of the aircraft by auto masking the reformed mesh assembly comprises:
identifying donor and interpolated mesh cells in the reformed mesh assembly; and
auto masking the reformed mesh assembly using the identified donor and interpolated mesh cells to create the masked mesh of the aircraft.

12. The non-transitory computer-readable storage medium of claim 10, wherein creating the mesh assembly of the aircraft by overlapping the background mesh and the structured chimera mesh for the deflected position of the movable aircraft control surface comprises:
creating the background mesh including a movable aircraft control surface cavity associated with the movable aircraft control surface requiring simulation of aerodynamics;
defining the overlapping boundaries between the background mesh and the deflected position of the movable aircraft control surface;
creating the structured chimera mesh for the deflected position of the movable aircraft control surface based on the defined overlapping boundaries; and
overlapping the background mesh and the structured chimera mesh to create the mesh assembly of the aircraft.

13. The non-transitory computer-readable storage medium of claim 10, wherein the movable aircraft control surface is selected from a group consisting of a rudder surface, an elevator surface and an aileron surface.

* * * * *